United States Patent [19]

Rado

[11] Patent Number: 4,489,045
[45] Date of Patent: Dec. 18, 1984

[54] RECOVERY OF BY-PRODUCT CALCIUM CHLORIDE FROM CHLORINATION OF TITANIFEROUS ORES

[75] Inventor: Theodore A. Rado, Oklahoma, Okla.

[73] Assignee: Kerr-McGee Chemical Corporation, Oklahoma City, Okla.

[21] Appl. No.: 505,288

[22] Filed: Jun. 17, 1983

[51] Int. Cl.³ .............................. C01F 1/00; C22B 1/00
[52] U.S. Cl. .................................... 423/79; 75/1 T; 423/155; 423/158; 423/164
[58] Field of Search ................ 423/79, 155, 158, 164; 75/1 T

[56] References Cited

U.S. PATENT DOCUMENTS 2,381,994  8/1945  Belchetz .......................... 423/158

Primary Examiner—Peter D. Rosenberg
Attorney, Agent, or Firm—William G. Addison

[57] ABSTRACT

A process for the recovery of calcium chloride produced in the conversion of metal chloride by-products of chlorination to hydrous metal oxides. The hydrous metal oxides and other by-products of chlorination are insoluble in an aqueous solution of at least about 75 weight percent calcium chloride having a generally neutral pH and temperature between about 174 degrees centigrade and about 200 degrees centigrade. Calcium chloride also is readily recovered from the above solution.

34 Claims, 2 Drawing Figures

RECOVERY OF BY-PRODUCT CALCIUM CHLORIDE FROM CHLORINATION OF TITANIFEROUS ORES

BACKGROUND OF THE INVENTION

Field of the Invention

In the chlorination of ores to produce particular metal chlorides, lime often is used to initiate the precipitation of metal chloride chlorination by-products as hydrous metal oxides accompanied by calcium chloride formation. The hydrous metal oxides and calcium chloride solutions usually are disposed of as waste. The present invention comprises a method of recovering said calcium chloride as well as hydrous metal oxides.

SUMMARY OF THE INVENTION

A process for treating metal chloride by-products of chlorinations comprising the following steps. First, chlorinate metalliferous ore in a chlorination zone to produce a first product stream comprising metal chlorides and metal chloride by-products. The metal chloride by-products next are separated from the first product stream, passed to a treatment zone and treated in the treatment zone to produce a comprisal of hydrous metal oxides and a solution comprising at least about 75 weight percent calcium chloride. At least a portion of the calcium chloride then is recovered.

DESCRIPTION OF THE PREFERRED EMBODIMENTS

Although the present invention is applicable to many ore chlorination processes, the preferred embodiments later described herein are directed toward the clorination of natural or synthetic titaniferous ores, such as ilmenite and perovskite, for example, to produce titanium tetrachloride.

In prior processes for titanium tetrachloride production by chlorination of titaniferous ore and reductants, the other metal chlorides produced often have been converted to hydrous metal oxides by the addition of lime. The hydrous metal oxides were disposed of as a waste sludge and the accompanying aqueously dissolved calcium chloride by-products released as waste. One of the primary objectives of the present invention is the capture of said calcium chloride in a usable form. Other objectives include the capture of said hydrous metal oxides in their individual forms and the recapture of reusable reductant and ore particles, as well as salt utilized in the chlorination process. Further objectives in increasing the efficiency of titanium tetrachloride production are inherent in the subsequently described embodiments.

Figure 1:
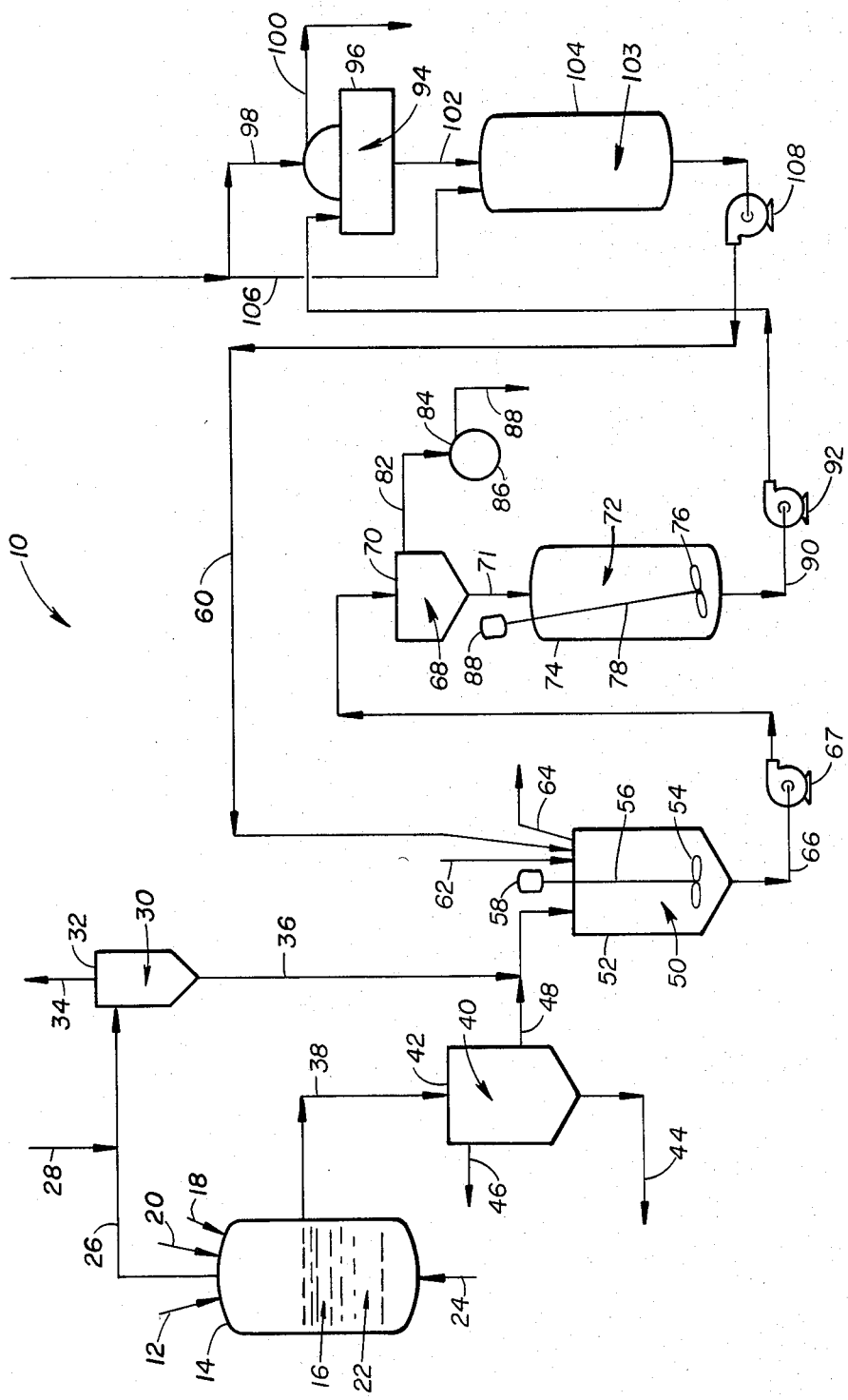
FIG. 1 diagrammatically shows the flow of materials in one embodiment of the present invention.

Shown in FIG. 1 is system 10 which is constructed in accordance with the present invention. The system 10 particularly is adapted for use with the chlorination of calcium-rich titaniferous ores, such as perovskite, although it may also be used with the chlorination of many other types of titaniferous ores for titanium chloride production, particularly those having an abundance of calcium.

A salt, preferably sodium chloride, potassium chloride, or a mixture of sodium chloride and potassium chloride, is added through a conduit 12 to a first chlorinator 14. In the first chlorinator 14, the salt is maintained at a temperature between about 800 degrees centigrade and about 1000 degrees centigrade and always above the melting point of the salt being utilized to produce a first chlorination zone 16 comprising molten salt in the first chlorinator 14.

Titaniferous ore, natural or synthetic and in one embodiment in a finely divided form, is introduced through a conduit 18 into the first chlorination zone 16. In many cases of ore chlorination a carbonaceous reductant, preferably coke and in one embodiment a fine particulate form, is also introduced from a provided source through a conduit 20 into the first chlorination zone 16. The reductant may be introduced through the conduit 18 used for ore introduction, simultaneously with the ore or sequentially thereto, if desired in a particular application. An ore to reductant ratio of between about 6 to about 10 and preferably about 6.5 to about 7 is maintained to produce a first loaded chlorination zone 22. The molten salt content of the first loaded chlorination zone 22 preferably is maintained in the range of about 80 weight percent to about 90 weight percent. The first loaded chlorination zone 22 is maintained in the temperature range mentioned before with respect to the salt in the chlorinator 14.

Chlorine gas then is passed from a provided source into the first loaded chlorination zone 22 through a conduit 24. As the chlorine permeates the first loaded chlorination zone 22, a chlorination reaction ensues producing a first molten salt residuum comprising chlorination by-products and a first product stream comprising metal chloride, in this case titanium tetrachloride, and metal chloride by-products resulting from the chlorination of other metals in the ore.

The first product stream comprising titanium tetrachloride passes from the first chlorinator 14 through a conduit 26. The first product stream also comprises chlorination by-products, including volatile chlorides of metals such as tine, silicon and iron or mixtures thereof, for example.

In this particular system 10, cooled titanium tetrachloride is added to the first product stream through a conduit 28 to produce a cooled first product stream comprising titanium tetrachloride and condensed particles of volatile metal chlorides having higher boiling points than that of titanium tetrachloride. The cooled first product stream is passed through the conduit 26 into the first separation zone 30 of a first separator 32, preferably a cyclone type of separator, to produce a first purified product stream comprising purified titanium tetrachloride and a first particulate residue comprising condensed particles of volatile metal chlorides. The first purified product stream flows from the first separator 32 through a conduit 34 for further processing, use or storage. The first particulate residue flows from the first separator 32 via a conduit 36 to a fate described later herein.

After a period of chlorination, the first molten salt residuum from the chlorinated loaded chlorination zone 22 comprising salt and metal chloride chlorination by-products is passed, preferably on a continual basis, from the first chlorinator 14 through a conduit 38 into a first settling zone 40 of a first settling tank 42. In the first settling zone 40, the salt is maintained in a molten condition and the settling of ore and reductant fragments is permitted to ensure, producing settled ore fragments, settled reductant fragments and a first clarified molten salt residuum comprising molten salt and chlorination by-products.

In this particular system 10, the first chlorinator 14 and the first settling tank 42 are separate although their functions may be combined in a single chlorinator-type design in a manner which will be apparent to those skilled in the art in view of the description contained herein.

When present, ore fragments are withdrawn from the first settling tank 42 through a conduit 44 and reductant fragments are withdrawn from the first settling tank 42 through a conduit 46. The withdrawn fragments are preferably returned to the chlorination zone 16, separately or together (not shown).

The first clarified molten salt residuum is passed from the first settling tank 42 through a conduit 48 into a first treatment zone 50 of a dissolving-neutralizing tank 52. The first particulate residue from the first separator 32 passes into the first treatment zone 50 through connected conduits 36 and 48, and this residue is intermixed with the first clarified molten salt residuum from the first settling tank 42.

The dissolving-neutralizing tank 52 has a mixer 54 attached by a shaft 56 to a power source 58 for mixing contents in the treatment zone 50. A solution comprising water (whose source is later discussed) is added to the first treatment zone 50 through a conduit 60 to cool and dissolve at least a portion of the first particulate residue and first clarified molten salt residuum. Lime, preferably essentially calcium oxide or quick lime, is added to the first treatment zone 50 through a conduit 62 to produce a first comprisal of substantially insoluble salt and hydrous metal oxides and a solution comprising at least about 75 weight percent and preferably between about 75 weight percent and about 78 weight percent calcium chloride. Slaked lime also may be used in particular applications with a lesser addition of water.

The first comprisal in the treatment zone 50 preferably is maintained at a temperature between about 174 degrees centigrade and about 200 degrees centigrade. A pH in the range of between about 7 and about 10 also is preferably maintained in the comprisal.

Steam produced in the treatment zone 50 is passed from the dissolving-neutralizing tank 52 through a conduit 64. The first comprisal is passed through a conduit 66 and through a pump 67, the comprisal being pumped from the dissolving-neutralizing tank 52 into a second settling zone 68 of a second settling tank 70.

The first comprisal is allowed to settle in the second settling zone 68 to produce a first supernatant solution comprising at least about 75 weight percent and preferably between about 75 weight percent and about 78 weight percent calcium chloride and a first sediment of insoluble chlorination by-products comprising salt, residual ore fragments, residual reductant fragments and hydrous metal oxides. The first sediment and first supernatant solution substantially are separated in the second settling zone 68 and the first sediment is passed through a conduit 71 from the second settling tank 70 into a first mixing zone 72 of a first surge tank 74. The first surge tank 74 has a mixer 76 connected by a shaft 78 to a power source 80 for mixing the first sediment to produce a first mixed sediment.

The first supernatant solution is passed from the second settling tank 70 through a conduit 82 to recovery in commercially usable form, for example by flaking in the first flaking zone 84 of a first flaker 86. In the first flaking zone 84, at least a portion of the calcium chloride is frozen and converted into flakes comprising about 78 weight percent calcium chloride. The calcium chloride flakes are passed from the first flaker 86 through a conduit 88 and the flakes are recovered for use or further processing.

The first mixed sediment is passed from the surge tank 74 through a conduit 90 and pump 92, the first mixed sediment being pumped into a first filtration zone 94 of a first filter 96. In the first filtration zone 94, the first mixed sediment is processed, preferably by filtration, to produce a first cake of sludge comprising salt, ore fragments, reductant fragments, and hydrous metal oxides and a first filtrate comprising calcium chloride and water. The first cake is washed with water provided through a conduit 98 to produce washings and a washed first cake which is removed from the filter 96 through a conduit 100 for disposal or further processing.

The washings and first filtrate are passed from the filter 96 through a conduit 102 into a first storage zone 103 of a first filtrate receiver 104 where they are mixed and supplemented with water provided through a conduit 106 to produce a supplemented first filtrate wash. The supplemented first filtrate wash then is recycled from the first filtrate receiver 104 through a conduit 60 and a pump 108, the wash being pumped into the treatment zone 50 of the dissolving-neutralizing tank 52.

EMBODIMENT OF FIG. 2

Figure 2:
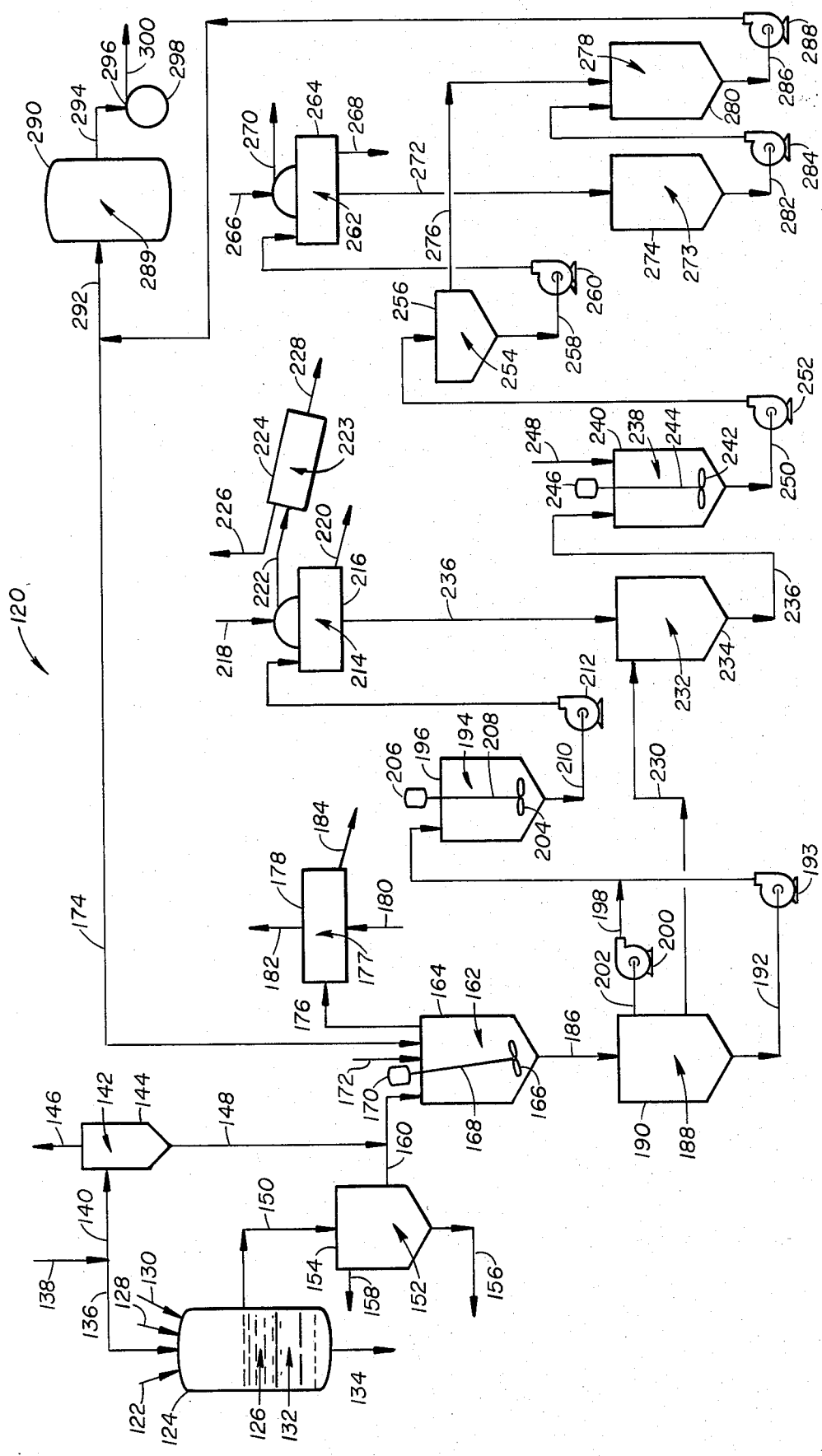
FIG. 2 diagrammatically shows the flow of materials in another embodiment of the present invention.

Shown in FIG. 2 is a system 120 which also is constructed in accordance with the present invention. This system 120 particularly is adapted for use with the chlorination of titaniferous ores, such as ilmenite, although it may also be used in connection with the chlorination of other types of titaniferous ores, particularly those not having an abundance of calcium. Among the objectives of the system 120, in addition to those mentioned before with respect to the system 10, is the provision of methods for the recovery and recycle of salts utilized in chlorination, the recovery and recycle of calcium chloride, and the recovery of hydrous metal oxides either together or as individual metallic species.

As shown in FIG. 2, a salt, preferably sodium chloride, potassium chloride, calcium chloride, or a mixture thereof is introduced through a conduit 122 into a second chlorinator 124. In the second chlorinator 124, the salt is maintained at a temperature between about 800 degrees centigrade and about 1000 degrees centigrade, and always above the melting point of the salt being utilized to produce a second chlorination zone 126.

Titaniferous ore, natural or synthetic, and in one embodiment in a finely divided form, is introduced through a conduit 128 into the second chlorination zone 126. Reductant, preferably carbonaceous and in one embodiment preferably coke and in a finely divided form, is introduced from a provided source into the second chlorination zone 126 through a conduit 130 to produce a second loaded chlorination zone 132. The reductant may be introduced through the conduit 130 used for ore introduction into the second chlorination zone 124 and may be premixed with the ore or introduced separately. The ratio of ore to reductant and the salt content of the second loaded chlorination zone is the same as described before with respect to the first loaded chlorination zone 22 of the system 10.

Chlorine gas then is passed from a provided source into the second loaded chlorination zone 132 through a conduit 134 to produce a second molten salt residuum and a second product stream comprising metal chloride and metal chloride by-products. The second product stream comprising titanium tetrachloride flows from the second chlorinator 124 through a conduit 136. The second product stream also comprises chlorination by-products including volatile chlorides of metals such as tin, silicon, iron, or mixtures thereof, for example.

In this embodiment, although not necessary in all applications of the present invention, cooled titanium tetrachloride is added to the second product stream through a conduit 138 to produce a cooled second product stream. The cooled second product stream comprises cooled titanium tetrachloride and condensed particles of volatile metal chlorides having higher boiling points than titanium tetrachloride. The cooled second product stream is passed through a conduit 140 to the second separation zone 142 of a second separator 144, preferably a cyclone type of separator. In the second separation zone 142, the cooled second product stream is separated to produce a second purified product stream comprising purified titanium tetrachloride and a second particulate residue comprising by-product metal chlorides.

The second purified product stream flows from the second separator 144 through a conduit 146 for further processing, use, or storage. The second particulate residue flows from the second separator 144 through a conduit 148.

After a period of chlorination, the second molten salt residuum is passed from the second chlorinator 124, preferably on a continual basis, through a conduit 150 to a second settling zone 152 of a second settling tank 154. In the second settling zone 152, the second molten salt residuum is maintained in a molten condition and the settling of ore and reductant fragments is permitted to ensue, producing a portion of the ore as settled ore fragments, a portion of the reductant as settled reductant fragments and a second clarified molten salt residuum comprising molten salt, chlorination by-products and any residual ore and reductant fragments.

As described before with respect to the system 10, the chlorinator 124 and settling tank 154 may be combined in single unit of appropriate design with dual functions.

In either case, ore fragments are withdrawn from the second settling zone 152 through a conduit 156 and reductant fragments are withdrawn through another conduit 158. Both fragment types preferably are returned (not shown) to the second chlorination zone 126.

The second clarified molten salt residuum is passed from the second settling tank 154 through a conduit 160 to a dissolving zone 162 of a dissolving tank 164. The second particulate residue passes to the dissolving zone 162 through interconnected conduits 148 and 160, and the residue is mixed into the second clarified molten salt residuum.

The dissolving tank 164 has a mixer 166 attached by a shaft 168 to a power source 170. A solution comprising water (whose preferable source is discussed later herein) is passed into the dissolving zone 162 of the dissolving tank 164 through a conduit 172 to cool and dissolve at least a portion of the second clarified molten salt residuum. An aqueous solution comprising calcium chloride (whose preferable source is discussed later herein) then is added to the dissolving zone 162 through a conduit 174 and the contents of the dissolving zone 162 mixed therein to produce an aqueous fluid comprising at least about 75 weight percent and preferably between about 75 weight percent and about 78 weight percent calcium chloride.

The aqueous fluid is maintained at a temperature between about 174 degrees centigrade and about 200 degrees centigrade to produce a second comprisal including a solution comprisint calcium chloride (at the above described weight percent), metal chloride by-products of chlorination and particulate solids comprising residue ore, residual reductant and salt. A portion of the steam produced by the contact of water and molten salt of the second process fluid is passed from the dissolving tank 164 through a conduit 176 to a condensing zone 177 of a condenser 178. The condensing zone 177 is cooled by the entry through a conduit 180 of cooling water which exits through another conduit 182. Condensate from the steam passes from the condenser 178 through a conduit 184 for disposal, further use, or processing.

The second comprisal passes from the dissolving zone 162 through a conduit 186 to a third settling zone 188 of a third settling tank 190. In the third settling zone 188, the second comprisal is maintained at the temperature described before with respect to the dissolving zone 162 and settling is permitted to ensure, producing a second supernatant solution comprising at least about 75 weight percent and preferably between about 75 weight percent and about 78 weight percent calcium chloride and metal chloride chlorination by-products and a second sediment comprising salt, and residual ore and reductant.

The second sediment is separated from the second supernatant solution and is passed from the third settling tank 190 through a conduit 192 and a pump 193, the sediment being pumped into a second mixing zone 194 of a slurry surge tank 196. When desired, the second sediment passing through the conduit 192 may be supplemented with a portion of the second supernatant solution supplied through a conduit 198 and a pump 200 connected to an upper portion 202 of the third settling tank 190 and the conduit 192.

The slurry surge tank 196 preferable but not necessary to the practice of the present invention has a mixer 204 connected to a power source 206 by a shaft 208 and may be by-passed. After mixing in the second mixing zone 194 of the slurry surge tank 196, a slurry is produced which is passed through a conduit 210 and pump 212, the slurry being pumped into a second filtration zone 214 of a second filter 216. In the second filtration zone 214, the slurry is filtered to produce both a second cake comprising salt and fragments of ore and reductant and a second filtrate comprising a fluid similar to the second supernatant solution described above.

The second cake is washed with a water spray provided through a conduit 218 to produce a washed second cake and wash water leavings. The wash water leavings pass from the second filter 216 through a conduit 220 and are circulated (not shown) to provide a portion of the water entering the dissolving tank 164 through a conduit 172. The washed second cake passes through a conduit 222 from the second filter 216 into a drying zone 223 formed in a drier 224, preferably a rotary drier. In the drying zone 223, water vapor and a dried second cake comprising salt and residual ore and coke are produced.

The water vapor passes from the drier 224 through a conduit 226 and the dried second cake passes from the drier 224 through a conduit 228. The dried second cake is recirculated (not shown) to the second chlorination zone 126.

The second supernatant solution passes from the third settling tank 190 through a conduit 230 into a collection zone 232 of a second surge tank 234. Also entering the second surge tank 234 is the second filtrate passing through a conduit 236 from the second filter 216 to produce a first mixed supernatant solution. The first mixed supernatant solution passes from the second surge tank 234 through a conduit 236 into a second treatment zone 238 of a neutralizing tank 240. The neutralizing tank 240 has a mixer 242 connected by a shaft 244 to a power source 246.

Lime, preferably essentially calcium oxide, is added to the first mixed supernatant solution in the second treatment zone 238 through a conduit 248 while mixing is conducted until a pH of between about 7 and about 10 is reached. This increase in pH initiates the formation of a third comprisal comprising substantially insoluble hydrous metal oxides derived from metal chloride by-products of chlorination and a solution preferably comprising at least about 75 weight percent calcium chloride. This solution is between about 75 weight percent and about 78 weight percent calcium chloride in the most particularly preferred embodiment of the present invention. Although calcium chloride concentrations of at least 75 weight percent are desireable in this system 120, lesser concentrations of calcium chloride, for example 40 to 50 weight percent, could be produced and recovered as liquid for use or further processing.

To complete the process description where substantially insoluble hydrous metal oxides are precipitated together in the neutralization zone 238, the third comprisal is passed from the neutralizing tank 240 through a conduit 250 and a pump 252, into a fourth settling zone 254 of a fourth settling tank 256. In the fourth settling zone 254 of the fourth settling tank 256, settling is permitted to ensue to produce a third supernatant solution comprising at least about 75 weight percent calcium chloride.

The third sediment is separated from the third supernatant solution and is passed from the fourth settling zone 254 through a conduit 258 and a pump 260, the third sediment being pumped into a third filtration zone 262 of a third filter 264. In the third filtration zone 262, a third cake comprising hydrous metal oxides and a third filtrate comprising calcium chloride are produced.

The third cake in the third filtration zone 262 is washed with a spray of water provided through a conduit 266 to produce a washed third cake and washings. The washings pass from the third filter 264 through a conduit 268 and are circulated (not shown) to enter the dissolving tank 164 through a conduit 172. The washed third cake passes from the third filter 264 through a conduit 270 and is recovered for use, further processing or disposal. The third filtrate from the third filter 264 passes through a conduit 272 to the retention zone 273 of a storage tank 274.

The third supernatant solution passes from the fourth settling zone 254 through a conduit 276 to the second storage zone 278 of the third surge tank 280. The third filtrate from the retention zone 273 also passes to the second storage zone 278 of the third surge tank 280 through a conduit 282 and a pump 284 and is mixed with the third supernatant solution to form a second mixed supernatant solution.

The second mixed supernatant solution passes from the second storage zone 278 through a conduit 286 and a pump 288. If substantially complete neutralization has been accomplished in the neutralization zone 238, the second mixed supernatant solution comprises at least about 75 weight percent calcium chloride and preferably between about 75 weight percent and about 78 weight percent calcium chloride with little metal chloride chlorination by-products. At least a portion of the second mixed supernatant solution is directed into the polishing zone 289 of a polishing filter 290 through a conduit 292 and at least a portion of the second mixed supernatant solution is recirculated to the dissolving zone 162 of the dissolving tank 164 through a conduit 174. The particular proportioning of the second mixed supernatant solution depends upon the needs of the particular processing being accomplished.

In the polishing zone 289, any residual particles present are separated, preferably filtered, to produce a polished supernatant solution comprising at least about 75 weight percent calcium chloride. The polished supernatant solution is passed from the polishing filter 290 through a conduit 294 to recovery in the second flaking zone 296 of a second flaker 298, flaker. In the second flaking zone 296, flakes comprising about 78 weight percent calcium chloride are produced by cooling the polished supernatant solution and pass from the second flaker 298 through a conduit 300 and are recovered for use or further processing.

It is understood that the above described addition of lime may be subdivided into a series of steps in multiple neutralization zones (not shown) with either system 10, or 120. When such a serial procedure is followed in system 120, an increment of lime would be added to the first mixed supernatant solution in the second treatment zone 238 sufficient to produce the formation of a first metallic species of insoluble hydrous metal oxide in the treated first mixed supernatant solution. The treated first mixed supernatant solution would be passed to a settling zone (not shown) to produce a supernatant solution comprising less than about 75 weight percent calcium chloride and a sediment comprising the first metallic species of insoluble hydrous metal oxide.

The first metallic species of insoluble hydrous metal oxide would be recovered as a cake in a filtration zone (not shown) and the supernatant solution comprising less than about 75 weight percent calcium chloride would be passed to another neutralization zone (not shown) for a further addition of lime to produce the formation of a second metallic species of insoluble hydrous metal oxide.

The settling, filtration and further lime additions would be carried out as described for the first incremental lime addition step until finally all metallic species of hydrous metal oxides have been recovered and the neutralization is complete. The final supernatant solution obtained in this sequence would be similar to the second mixed supernatant solution described above and would be similarly treated for recycle to the dissolving zone 162 or polishing and calcium chloride recovery.

Although both systems 10 and 120 of the present invention involve chlorination in a chlorination zone 16 or 120 comprising molten salt, the method described with respect to the system 10 of the present invention is applicable in the case of conventional titanium tetrachloride production by chlorination conducted in a fluidized bed of particulate titaniferous ore and reductant. In this case, there would be no first settling tank 42 and the sole chlorination by-products entering the treatment zone 50 of the dissolving-neutralizing tank 52 would be the first particulate residue via a conduit 36 from the first separator 32. A further difference in this case would be alterations in the amounts of lime and water required in the treatment zone 50 of the dissolving-neutralizing tank 52 to attain the earlier described pH and calcium chloride concentration of the aqueous fluid therein. Also in this case, the washed cake obtained from the first filter 96 would not comprise salt. In this particular case, the addition of lime to the treatment zone 50 could be conducted in increments as described for the addition of lime to the neutralizing tank 240 in the system 120. This incremental lime addition could be designed to selectively cause the formation of particular metallic species of hydrous metal oxides which could be recovered via a filter and the filtrate recirculated to the dissolving-neutralizing tank 52 for further additions of lime and appropriate recoveries of hydrous metal oxides.

From the foregoing description, it will be apparent to those skilled in the art that treatment of chlorination by-products with alkaline materials such as many salts, oxides, and hydroxides of the alkali or alkali earth metals could be used in place of lime for particular applications of the present invention.

Changes may be made in the construction, operation, and arrangement of the various segments, elements, steps, and procedures described herein without departing from the inherent concept and scope of the invention as defined in the following claims.

What is claimed is:

1. A process for treating metal chloride by-products produced by chlorinating metalliferous ore in a chlorination zone to produce a first product stream comprising metal chloride product and metal chloride by-products and separating the metal chloride by-products from the first product stream, comprising the steps of:
    passing the metal chloride by-products to a treatment zone;
    treating the metal chloride by-products with lime in the treatment zone to produce a mixture comprising hydrous metal oxides and a solution comprising at least about 75 weight percent calcium chloride; and
    recovering at least a portion of the calcium chloride.

2. The process of claim 1 wherein the metalliferous ore is defined further as being titaniferous ore.

3. The process of claim 2 wherein the chlorination zone is defined further as being a first chlorination zone and the first chlorination zone is defined further as comprising molten salt.

4. The process of claim 3 wherein the molten salt is defined further as comprising sodium chloride, potassium chloride or a mixture of sodium chloride and potassium chloride.

5. The process of claim 4 wherein the molten salt is defined further as having a temperature between about 800 degrees centigrade and about 1000 degrees centigrade and always above the melting point of the salt being utilized.

6. The process of claim 3 wherein chlorinating is defined further to include the steps of:
    introducing the titaniferous ore into the first chlorination zone;
    providing a source of carbonaceous reductant;
    introducing the carbonaceous reductant into the first chlorination zone to produce a first loaded chlorination zone;
    providing a source of chlorine gas; and
    passing chlorine gas into the first loaded chlorination zone.

7. The process of claim 6 wherein the metal chloride is defined further as comprising titanium tetrachloride and the metal chloride by-products are defined further as comprising volatile chlorides of tin, silicon, iron or mixtures thereof.

8. The process of claim 7 wherein the chlorinating is defined further as producing a first molten salt residuum comprising chlorination by-products and a first product stream comprising titanium tetrachloride and volatile chlorides of tin, silicon, iron or mixtures thereof.

9. The process of claim 8 wherein the separating step is defined further to include the steps of:
    passing the first product stream from the first chlorinator;
    cooling the first product stream to produce a cooled first product stream comprising titanium tetrachloride and condensed particles of volatile metal chloride by-products having higher boiling points than that of titanium tetrachloride;
    passing the cooled first product stream into a first separation zone; and
    separating the cooled first product stream to produce a first purified product stream comprising purified titanium tetrachloride and a first particulate residue comprising the condensed particles of volatile metal chloride by-products.

10. The process of claim 9 defined further to include, after the separating step, the steps of:
    passing the first molten salt residuum into a first settling zone; and
    settling the first molten salt residuum to produce both a first clarified molten salt residuum comprising molten salt and metal chloride by-products and settled fragments of ore and reductant.

11. The process of claim 10 wherein the treatment zone is defined further as being a first treatment zone and, wherein the process is defined further to include after the settling step, the steps of:
    passing the first particulate residue to the first treatment zone; and
    passing the first clarified molten salt residuum to the first treatment zone.

12. The process of claim 11 wherein the treating step is defined further to include the steps of:
    adding a solution comprising water to the first treatment zone to dissolve at least a portion of the first particulate residue and the first clarified molten salt residuum; and
    adding lime to the first treatment zone to produce a first mixture comprising substantially insoluble salt and hydrous metal oxides and a solution comprising at least about 75 weight percent calcium chloride.

13. The process of claim 12 wherein the first mixture is defined further as having a pH between about 7 and about 10 and being at a temperature of between about 174 degrees centrigrade and about 200 degrees centigrade.

14. The process of claim 13 wherein the step of recovering the calcium chloride is defined further to include the steps of:

passing the first comprisal to a second settling zone to produce a first supernatant solution comprising at least about 75 weight percent calcium chloride and a first sediment of insoluble chlorination by-products comprising salt and hydrous metal oxides;

separating substantially the first sediment and the first supernatant solution;

passing the first supernatant solution to a first flaking zone;

freezing the first supernatant solution in the first recovery zone to produce flakes comprising about 78 weight percent calcium chloride; and recovering the calcium chloride flakes.

15. The process of claim 14 defined further to include the steps of:

mixing the first sediment to produce a first mixed sediment;

passing the first mixed sediment to a first filtration zone; and processing the first mixed sediment in the first filtration zone to produce a first cake of sludge comprising salt and hydrous metal oxides.

16. The process of claim 15 wherein the titaniferous ore is defined further as being perovskite.

17. The process of claim 2 wherein the chlorination zone is defined further as being a second chlorination zone and the second chlorination zone is defined further as comprising molten salt.

18. The process of claim 17 wherein the molten salt is defined further as comprising sodium chloride, potassium chloride, calcium chloride or a mixture thereof.

19. The process of claim 18 wherein the molten salt is defined further as having a temperature between about 800 degrees centigrade and about 1000 degrees centigrade, and always above the melting point of the salt being utilized.

20. The process of claim 18 wherein the chlorinating is defined further to include the steps of:

introducing the titaniferous ore into the second chlorination zone;

providing a source of carbonaceous reductant;

introducing the carbonaceous reductant into the second chlorination zone to produce a second loaded chlorination zone;

providing a source of chlorine gas; and passing chlorine gas into the second loaded chlorination zone.

21. The process of claim 20 wherein the metal chloride product is defined further as comprising titanium tetrachloride and the metal chloride by-products are defined further as comprising volatile chlorides of tin, silicon, iron or mixtures thereof.

22. The process of claim 21 wherein the chlorinating is defined further as producing a second molten salt residuum comprising metal chloride by-products and a second product stream comprising titanium tetrachloride and volatile chlorides of tin, silicon, iron or mixtures thereof.

23. The process of claim 22 wherein the separating step is defined further to include the steps of:

passing the second product stream from the second chlorination zone;

cooling the second product stream to product a cooled second product stream comprising titanium tetrachloride and condensed particles of volatile metal chlorides having higher boiling points than that of titanium tetrachloride;

passing the cooled second product stream into a second separation zone; and separating the cooled second product stream in the second separation zone to produce a second purified product stream comprising titanium tetrachloride and a second particulate residue comprising the condensed particles of volatile metal chlorides.

24. The process of claim 23 defined further to include, after the separating step, the steps of:

passing the second molten salt residuum into a third settling zone; and settling the second molten salt residuum to produce both a second clarified molten salt residuum comprising molten salt and metal chloride by-products and settled fragments of ore and reductant.

25. The process of claim 24 defined further to include, after the settling step, the steps of:

passing the second clarified molten salt residuum to a dissolving zone;

passing the second particulate residue to the dissolving zone;

adding an aqueous solution comprising calcium chloride to the dissolving zone;

mixing the contents of the dissolving zone to produce an aqueous fluid comprising at least about 75 weight percent calcium chloride;

maintaining the aqueous fluid at a temperature between about 174 degrees centigrade and about 200 degrees centigrade to produce a second mixture comprising both particulate solids containing residual ore, residual reductant and salt and a solution comprising at least 75 weight percent calcium chloride and metal chloride by-products;

passing the second mixture to a third settling zone;

settling the second mixture in the third settling zone to produce both a second supernatant solution comprising at least about 75 weight percent calcium chloride and metal chloride by-products and a second sediment comprising salt and residual ore and reductant;

separating the second sediment from the second supernatant solution;

mixing the second sediment to produce a slurry;

passing the slurry to a second filtration zone;

filtering the slurry in the second filtration zone to produce both a second cake comprising salt and residual ore and reductant and a second filtrate;

washing the second cake to produce a washed second cake;

passing the washed second cake to a drying zone;

drying the washed second cake in the drying zone to produce a dried second cake; and recirculating the dried second dried cake to the second chlorination zone.

26. The process of claim 25 wherein the treatment zone is defined further as being a second treatment zone and the treating step is defined further as including the steps of:

passing the second supernatant solution and the second filtrate into a collection zone to produce a first mixed supernatant solution;

passing the first mixed supernatant solution into the second treatment zone;

adding lime to the first mixed supernatant solution in the second treatment zone to produce a third mixture having a pH between about 7 and about 10 and comprising substantially insoluble hydrous metal oxides and a solution comprising at least about 75 weight percent calcium chloride:

passing the third mixture to a fourth settling zone;

settling the third mixture in the fourth settling zone to produce a third supernatant solution comprising at least about 75 weight percent calcium chloride and a third sediment comprising hydrous metal oxides; and separating the third supernatant solution from the third sediment.

27. The process of claim 26 defined further to include the steps of:

passing the third sediment to a third filtration zone;

filtering the third sediment in the third filtration zone to produce a third cake comprising hydrous metal oxides and a third filtrate comprising calcium chloride; and passing the third filtrate to a retention zone.

28. The process of claim 27 defined further to include the steps of:

washing the third cake in the third filtration zone with a spray of water to produce a washed third cake; and recovering the washed third cake.

29. The process of claim 27 defined further to include the steps of:

passing the third supernatant solution from the fourth settling zone to a second storage zone;

passing the third filtrate from the retention zone to the second storage zone; and mixing the third supernatant solution and the third filtrate to form a second mixed supernatant solution comprising at least 75 weight percent calcium chloride in the second storage zone.

30. The process of claim 29 wherein the step of recovering at least a portion of the calcium chloride is defined further as:

directing at least a portion of the second mixed supernatant solution from the second storage zone to a polishing zone;

polishing the second mixed supernatant solution to produce a polished supernatant solution comprising at least about 75 weight percent calcium chloride;

passing the polished supernatant solution to a second flaking zone;

cooling the polished supernatant solution in the second flaking zone to produce flakes comprising about 78 weight percent calcium chloride; and recovering the flakes.

31. The process of claim 29 defined further to include the step of recirculating at least a portion of the second mixed supernatant solution from the second storage zone to the dissolving zone.

32. The process of claim 31 wherein the titaniferous ore is defined further as being ilmenite.

33. The process of claim 1 wherein the solution is defined further as comprising between about 75 weight percent and about 78 weight percent calcium chloride.

34. The process of claim 1 defined further to include the step of recovering the hydrous metal oxides.

* * * * *